April 11, 1939.  C. A. BUTTS  2,154,148
BITE GAUGE
Filed Feb. 24, 1938
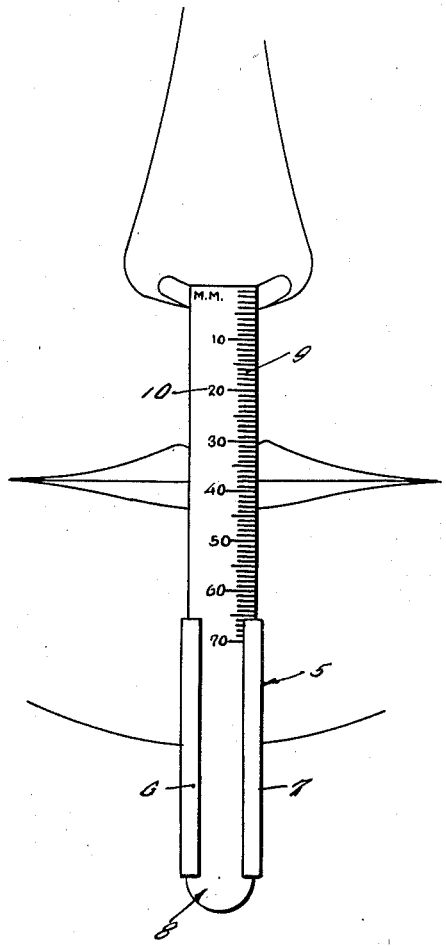
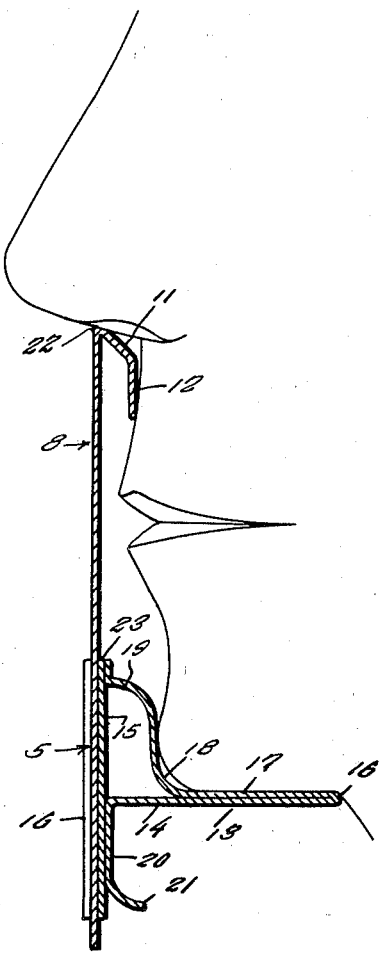
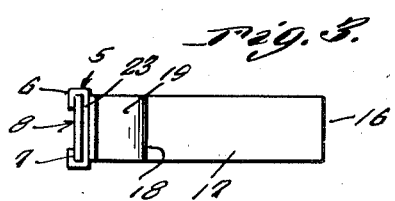
Inventor
C. A. Butts
By Clarence A. O'Brien
Hyman Berman
Attorneys Patented Apr. 11, 1939

2,154,148

UNITED STATES PATENT OFFICE 2,154,148

BITE GAUGE

Charlie A. Butts, Grand Island, Nebr.

Application February 24, 1938, Serial No. 192,399

2 Claims. (Cl. 33—174)

My invention relates generally to dental gauges, and particularly to a gauge to be used to insure the obtaining of a correct bite in making and installing false dentures, and an important object of my invention is to provide an arrangement of this character which is simple and efficient and easily used without discomfort to the patient.

Other important objects of my invention will be apparent from a reading of the following description taken in connection with the drawing, wherein for purposes of illustration I have shown a preferred embodiment of my invention.

In the drawing:

Figure 1 is a front elevational view of the bite gauge showing the same applied to a human face.

Figure 2 is a transverse vertical sectional view taken approximately centrally through Figure 1.

Figure 3 is a top plan view of the gauge.

Referring in detail to the drawing, the numeral 5 generally designates an elongated relatively narrow body member composed of a plate having marginal portions thereof bent over to provide the flanges 6 and 7 which define channels for slidably guiding the movable gauge plate 8 which is considerably longer than the body 5 and is provided along its upper part with graduations 9 with appropriate designating indicia 10. The upper end of the gauge plate 8 has a rearwardly declining portion 11 from the free end of which depends a lip engaging portion 12 which is spaced rearwardly and approximately parallelly from the gauge plate 8 as clearly illustrated in Figure 2 of the drawing.

Fastened to and extending rearwardly from the web of the body 5 is the approximately horizontal chin engaging member 13 which is suitably composed of flat light gauge material providing the straight member 14 projecting at right angles from the web 15 of the body 5 and terminating at its outer end in a hairpin bend 16 eventuating in a straight portion 17 lying along the top of the portion 14 and terminating at its inward end in a gentle curve 18 which constitutes means for engaging the point of the chin and terminates at its upper end in an oppositely curved portion 19 acting as a spacer and connecting with the upper part of the web 15 of the body 5. The portion of the plate 14 which meets the web of the body 5 has a depending portion 20 which terminates at its lower end in a decliningly curved portion 21 which constitutes a handle for the finger of the operator.

The gauge device of the invention is to be used to obtain the measurements of the patient before the teeth are extracted, to insure obtaining a correct bite when the temporary dentures are installed for this purpose, and to check the accuracy of the construction of the finished dentures when they are placed in the mouth of the patient.

To operate the device of the invention the operator places the first finger on the handle 21 with the thumb against the outer surface of the body 5 and against the gauge plate 8, and places the chin engaging portion 13 against the bottom of the chin of the patient and with the chin point engaging portion 18 firmly engaging the point of the chin of the patient, and with the lip engaging portion 12 lightly pressed against the upper part of the lip, and with the nose engaging portion 22 engaged lightly with a portion of the nose of the patient which is spaced outwardly from the lip, and which is ordinarily not subject to movement when the lip is moved in making the bite. The graduation 9 on the gauge plate 8 which corresponds in position to the lipline of the patient is then noted, and with the thumb still holding the gauge plate in place in the body 5 the instrument is removed and the reading on the gauge plate corresponding to the upper edge 23 of the body 5 is noted. Then when the temporary dentures are placed in the mouth of the patient to achieve the bite, the instrument, with the gauge plate positioned relative to the body 5 according to the readings taken originally, is installed on the face of the patient, and the bite stopped when the nose, the lip, and the chin of the patient reach the position originally occupied by them before the teeth were extracted. Then when the permanent dentures are tried in the mouth of the patient, a similar check is made on the accuracy of the bite provided for by the permanent dentures.

Although I have shown and described herein a preferred embodiment of my invention, it is to be definitely understood that I do not desire to limit the application of the invention thereto, and any change or changes may be made in the materials and in the structure and arrangement of the parts, within the spirit of the invention and the scope of the subjoined claims.

Having described the invention, what is claimed as new is:

1. A bite gauge of the class described comprising a vertically arranged member having a channel in its front face, a horizontally arranged part connected with the rear face for engaging the under part of the chin of a patient, an upwardly extending part connected with an intermediate portion of the chin engaging member and having a curve therein for receiving the point of the chin, a curved lower part connected with the rear face of the vertical part forming a finger hold, a scale strip slidably arranged in the channel of the vertical part and a rearwardly extending part connected with the upper end of the scale strip and having a depending portion for engaging the upper lip, the rearwardly extending portion engaging an under part of the nose.

2. A bite gauge of the class described comprising a vertically arranged part having bent over flanges on its front face forming a vertical channel, a horizontally arranged chin engaging member connected with the rear face of the vertical part, an upwardly extending portion connected with an intermediate part of the horizontal portion and having its lower part bowed outwardly to receive the point of the chin and its upper part curving forwardly and connected with the upper portion of the vertical part, a vertically arranged scale strip slidably arranged in the channel and having its upper end bent downwardly and rearwardly to engage the nose and the extremity of the bent portion being bent downwardly to engage the upper lip.

CHARLIE A. BUTTS.